Dec. 20, 1960    M. LOMBARDI    2,964,935
AUTOMOBILE COMBINATION IGNITION STARTER
Filed Dec. 1, 1958
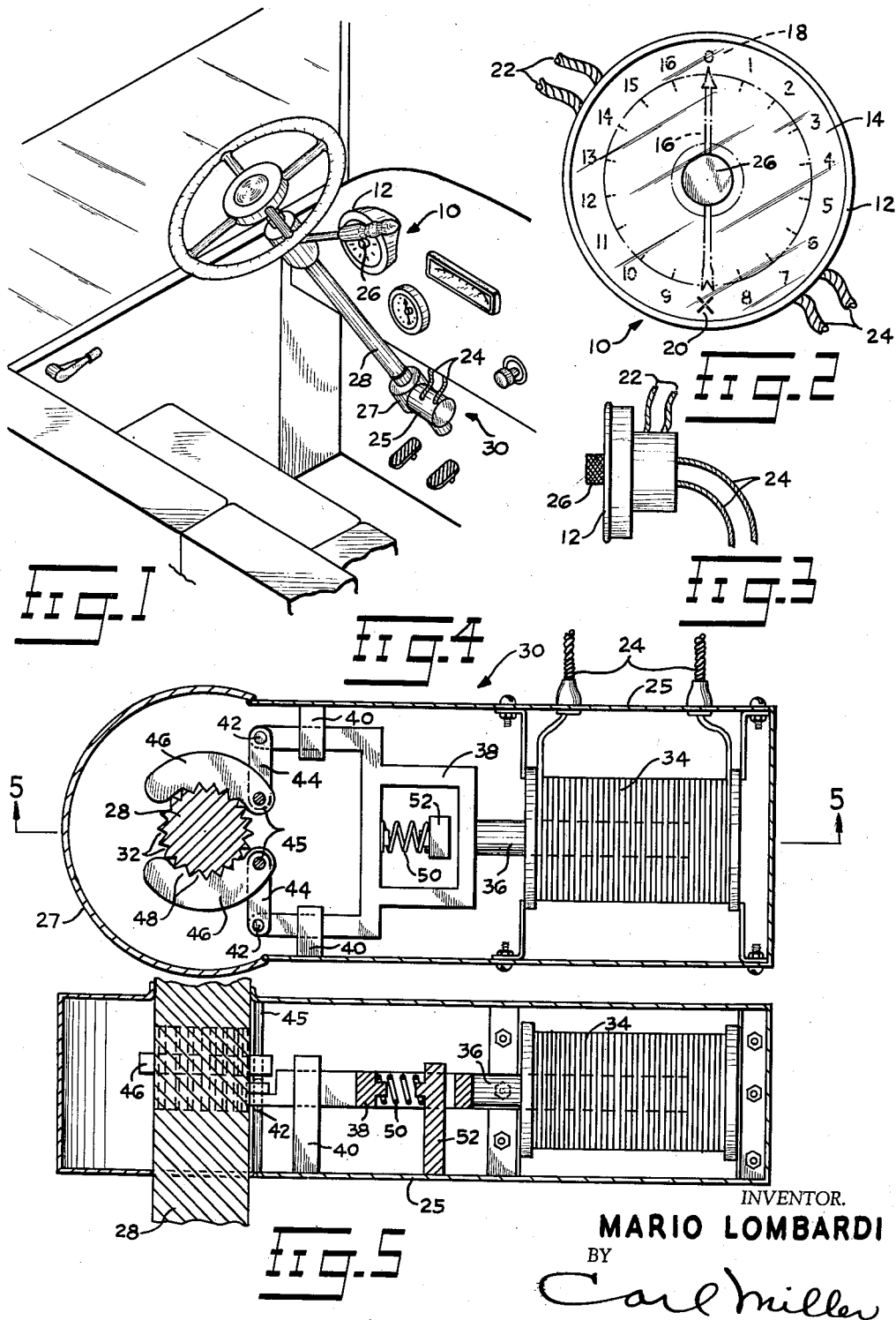
INVENTOR.
MARIO LOMBARDI
BY
*Carl Miller*
ATTORNEY United States Patent Office 2,964,935
Patented Dec. 20, 1960

2,964,935
AUTOMOBILE COMBINATION IGNITION STARTER

Mario Lombardi, 19 Greenwich Ave., New York 14, N.Y.

Filed Dec. 1, 1958, Ser. No. 777,306

2 Claims. (Cl. 70—252)

This invention relates to automotive vehicles and, more particularly, to an accessory therefore.

Ordinarily, it is possible for thieves to steal a locked vehicle simply by crossing the ignition wires thereof to start the engine even though the ignition switch may be locked. Accordingly, it is an object of the present invention to provide a combined ignition and steering column lock for automotive vehicles that will simultaneously clamp the steering column of the vehicle and deenergize the ignition system thereof so as to make it virtually impossible for such vehicle to be stolen without first unlocking the steering column.

A further object of the present invention is to provide a combined ignition and steering column lock of the type described that is completely controlled by means of a combination type lock so as to be operative in the absence of a key, so that there is no inconvenience resulting from lost keys, worn keys, or the like.

All of the foregoing and still further objects and advantages of this invention will become apparent from a study of the following specification, taken in connection with the accompanying drawing, wherein:

Figure 1 is a fragmentary perspective view of the interior of an automobile equipped with a steering column and ignition switch lock made in accordance with the present invention;

Figure 2 is an enlarged front view of a combination lock assembly forming a part of the present invention;

Figure 3 is a side elevational view of the device shown in Figure 2;

Figure 4 is an enlarged plan view, with the housing partly in section of a steering column lock assembly forming another part of the present invention; and Figure 5 is a longitudinal cross sectional view taken along line 5—5 of Figure 4.

Referring now to the drawing, and more particularly to Figure 1 thereof, an automobile equipped with an ignition and steering column lock made in accordance with the present invention is shown to include a combination type switch lock 10 forming a part of the present invention mounted upon the dashboard. This assembly 10 includes a housing 12 and a face plate 14 that has various indicia imprinted thereon. The dial portion 16 has the point thereof adjacent to the zero 18 which represents the off position of the switch. However, by rotating the point of the knob 16 to the cross shaped indicia 20, following the proper dialing of the unit, the switch connection through this assembly 10 is closed so that current will flow through the wires 22 connected to the battery of the vehicle and the leads 24 connected to the coil of a solenoid 34 mounted within the housing 25. This switch is further controlled by a push button 26 that must be depressed after the proper combination has been dialed so as to actually effect the energization of the coil 34.

As is more clearly shown in Figures 4 and 5 of the drawing, the housing 25 is secured to a substantially cylindrical housing 27 mounted around the steering column 28. The adjacent portion of the steering column 28 is provided with a plurality of serrations 32 that are engaged by similar serrations 48 on the inner surfaces of arcuate arms 46 of bell crank levers further including angularly extending arms 44. Both of the arms 44, 46 are integrally secured to pivot pins 45 mounted within the housing 25 or the assembly 30 for pivotal movement between a normally locked and an energized or actuated unlocked position. Additional pivot pins 42 pivotally connect the free ends of the arms 44 to the adjacent ends of the side arms of a frame 38 that are guidingly supported upon pedestals 40 for reciprocating longitudinal movement. This frame 38 is connected to the outer free end of an armature 36 that is mounted within the coil 34 of the solenoid for movement between a normally extended position and an energized retracted position. A compression coil spring 50 acting at one end upon a stop 52, is in abutment at the opposite end with the frame 38 and normally urges it toward the column locking position illustrated in Figure 4. However, in response to energization of the coil 34 by the proper operation of the combination type lock 10 hereinbefore described, the armature 36 is retracted, thus pivoting the jaws 46 out of locking engagement with the column 28 to permit the vehicle to be steered.

It will thus be recognized that the proper operation of the vehicle depends upon the proper setting of the combination type ignition switch lock in order to effect energization of the coil 34 to unlock the steering column. In the event that the wires of the switch are broken or severed, it becomes virtually impossible to energize the coil 34, thus preventing thieves from driving off with the vehicle.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A combined ignition and steering column lock for automotive vehicles comprising, in combination, a housing encircling a portion of the vehicle steering column, clamp means for releasable locking engagement with the vehicle steering column, electrical responsive means selectively unlocking said clamp means, combination lock actuated means for controlling the energization of said electrical responsive means, said clamp means comprising a frame slidably supported within said housing, a pair of bell cranks each pivotally supported intermediate its ends upon said housing, one end of each said crank being pivotally connected to said frame, the opposite end of each said crank being serrated for releasable locking engagement with a portion of the steering column, said electrical responsive means including a solenoid having a normally retracted armature, and the free end of said armature being connected to said frame, a compression spring acting at opposite ends between said frame and said housing removably urging said armature out of said retracted position, and movement of said armature out of said retracted position urging each said bell crank toward a latched position.

2. A combined ignition and steering column lock as set forth in claim 1, wherein said combination lock means comprises a combination lock mechanism and a switch connected in series with said solenoid and the vehicle battery supply, said switch being movable toward a closed position to energize said solenoid in response to predetermined adjustment of the combination lock mechanism.

References Cited in the file of this patent

UNITED STATES PATENTS

| 1,176,500 | Torrence | Mar. 21, 1916 |
| 1,363,285 | Stabler | Dec. 28, 1920 |

FOREIGN PATENTS

| 144,476 | Great Britain | June 17, 1920 |